(12) United States Patent
Yang et al.

(10) Patent No.: US 12,121,866 B2
(45) Date of Patent: Oct. 22, 2024

(54) METHOD FOR PREPARING ZEOLITE CHA MEMBRANE

(71) Applicant: DALIAN UNIVERSITY OF TECHNOLOGY, Liaoning (CN)

(72) Inventors: Jianhua Yang, Liaoning (CN); Linzhe Li, Liaoning (CN); Ying Lu, Liaoning (CN); Gaohong He, Liaoning (CN); Jinming Lu, Liaoning (CN); Yan Zhang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 25 days.

(21) Appl. No.: 18/030,684

(22) PCT Filed: Mar. 4, 2021

(86) PCT No.: PCT/CN2021/078992
§ 371 (c)(1),
(2) Date: Apr. 6, 2023

(87) PCT Pub. No.: WO2022/073323
PCT Pub. Date: Apr. 14, 2022

(65) Prior Publication Data
US 2023/0256396 A1 Aug. 17, 2023

(30) Foreign Application Priority Data
Oct. 9, 2020 (CN) .......................... 202011072131.2

(51) Int. Cl.
*B01D 67/00* (2006.01)
*B01D 71/02* (2006.01)

(52) U.S. Cl.
CPC ..... *B01D 67/0048* (2013.01); *B01D 67/0051* (2013.01); *B01D 71/0281* (2022.08)

(58) Field of Classification Search
CPC ............ B01D 67/0048; B01D 67/0051; B01D 71/0281
See application file for complete search history.

(56) References Cited

U.S. PATENT DOCUMENTS

| 8,409,326 B2 * | 4/2013 | Li ..................... B01D 71/0213 95/52 |
| 2020/0001250 A1 | 1/2020 | Miyahara et al. |
| 2020/0298187 A1 | 9/2020 | Choi et al. |
| 2022/0241732 A1 * | 8/2022 | Liu ......................... C01B 39/46 |

FOREIGN PATENT DOCUMENTS

| CN | 103599709 A | 2/2014 |
| CN | 103663491 A | 3/2014 |
| CN | 104857862 A | 8/2015 |
| CN | 106255545 A | 12/2016 |
| CN | 107433140 A | 12/2017 |
| CN | 107758691 A | 3/2018 |
| CN | 108083292 A | 5/2018 |
| CN | 108114613 A | 6/2018 |
| CN | 109999676 A | 7/2019 |
| CN | 111137904 A | 5/2020 |
| CN | 111348660 A | 6/2020 |
| CN | 112426891 A | 3/2021 |
| EP | 2402071 A1 | 1/2012 |

OTHER PUBLICATIONS

Huang, A. et al., "Enhancement of NaA zeolite membrane properties through organic cation addition," Separation and Purification Technology, Jul. 2008, vol. 61, Issue No. 2, pp. 175-181.

Jiang, J., et al., "Batch-scale preparation of hollow fiber supported CHA zeolite membranes and module for solvents dehydration," Microporous and Mesoporous Materials, Sep. 2017, vol. 250, pp. 18-26.

Wang, Lian-xia et al., "Research progress in molecular sieve membranes for separation", Modern Chemical Industry, Dec. 2018, vol. 38, Issue No. 12, pp. 62-66.

Li, Yu-Qin, et al., "Rapid Synthesis of Low-Silica Chabazite Zeolite with the Addition of Heterogenous Seeds", Chinese Journal of Inorganic Chemistry, Dec. 2018, vol. 34, Issue No. 12, pp. 2143-2152.

* cited by examiner

*Primary Examiner* — Michael P Wieczorek
(74) *Attorney, Agent, or Firm* — Muncy, Geissler, Olds & Lowe, P.C.

(57) ABSTRACT

In a method for preparing a zeolite CHA membrane, a gel conversion method is adopted to assist crystallization, seed solutions with different concentrations and sizes are successively coated on the surface of a porous support to obtain a seed layer, a synthetic gel is coated on the seed layer to obtain a gel layer, and then the porous support is subjected to a membrane crystallization reaction to obtain a zeolite CHA membrane. The method skips the conventional stage of converting the heterogeneous zeolite into the zeolite CHA seed, and directly takes a heterogeneous zeolite with the same secondary structural unit as that of zeolite CHA as a seed to directly prepare a zeolite CHA membrane on a support.

8 Claims, 3 Drawing Sheets

METHOD FOR PREPARING ZEOLITE CHA MEMBRANE

TECHNICAL FILED

The present invention belongs to the technical field of membrane separation materials, and relates to a method for preparing a zeolite CHA membrane, in particular to heteroseed epitaxial growth of a zeolite CHA membrane.

BACKGROUND

In the fields of petrochemical industry, fine chemical industry, pharmaceuticals & chemicals industry and new energy, product separation and purification are essential, among which the separation of a small or trace amount of water in an organic solvent is one of the most common unit processes in chemical production; especially, the dehydration and refining of organic matters in acidic conditions are urgently needed in the fields of petrochemical industry, organic chemical industry, fine chemical industry, pharmaceuticals & chemicals industry, daily-use chemical industry and new energy. Besides the needs of the dehydration and refining of various organic acid products containing acetic acid and acrylic acid, the dehydration and refining of many organic solvents are also conducted in acidic conditions in organic chemical industry. In industry, distillation is mainly used to remove water from organic solvents. However, as a traditional separation method, the distillation process has the disadvantages of high cost, high energy consumption, low efficiency and being easy to produce secondary pollution. Especially for the separation of some near-boiling or azeotropic systems, the separation effect of the traditional separation method is poor, and is difficult to meet industrial requirements.

Pervaporation is a new membrane separation technology for separating liquid mixtures, which has the advantages of simple and flexible operation, low energy consumption, high separation efficiency, no introduction of other reagents, no need of secondary treatment of products, no secondary pollution and easy amplification, can be widely used for the dehydration of organic solvents, is especially suitable for isomer, heat-sensitive, near-boiling and azeotropic systems that are difficult to be separated or cannot be separated by traditional separation methods, and is considered to be a very important and most promising high-tech in industrial technology transformation at present.

Pervaporation membranes can be divided into organic pervaporation membranes and inorganic pervaporation membranes. Compared with organic membranes, inorganic membranes have various advantages such as good thermochemical stability, long service life, less wearing parts of equipment, low maintenance cost, convenient replacement of membrane components, high membrane flux, large separation factor, no swelling and solvent corrosion resistance, thus becoming preferred membranes for pervaporation. The inorganic pervaporation membranes use zeolite as a membrane material (core separation membrane), and use the regular pore structure thereof to realize molecular level separation of different components.

Zeolite CHA, also known as chabazite, has a three-dimensional eight-membered-ring system with a pore size of 0.38 Å, and the silica to alumina ratio (SAR) of the framework can be accurately regulated between 2 and ∞ (Microporous and Mesoporous Materials, 2017, 250: 18-26.). An eight-membered ring is composed of 8 atoms (T atoms) in a tetrahedral coordination structure; each T atom is covalently bound to 4 oxygen atoms, shares one oxygen atom with an adjacent T atom tetrahedron, and is connected with other T atoms to form a three-dimensional cage structure. The pore size of zeolite CHA is greater than that of water molecules and $CO_2$ molecules, but smaller than that of most gas molecules and organic solvent molecules, so zeolite CHA has a potential high molecule sieving selectivity. Therefore, a zeolite CHA membrane can not only be applied to the dehydration of organic solvents, but is also an excellent and ideal separation membrane material in the field of gas separation. The SAR of zeolite CHA can be regulated in a wide range, which makes the zeolite CHA membrane have superior acid stability.

At present, zeolite CHA membranes are mainly prepared by a secondary growth method. The secondary growth method is to coat homogenous zeolite seeds on the surface of a support to form a seed layer, and then the seed layer is subjected to a crystallization reaction in a synthetic gel under the inducing action of the seeds to form a continuous and dense zeolite membrane layer (Modern Chemical Industry, 2018, 38(12): 62-66.). The nucleation phase and growth phase of zeolite crystal are separated by precoating the seeds, so that the growth rate of the crystal in the membrane is controlled, and the preparation of the zeolite membrane layer with controllable microstructures such as membrane thickness, grain size and orientation is realized (Separation and purification technology, 2008, 61(2): 175-181.). However, the limitation of preparing a zeolite CHA membrane by the method lies in that the most critical zeolite CHA seeds are difficult to be directly synthesized from an amorphous sol synthetic gel containing an aluminum source and a silicon source. At present, the zeolite CHA seeds are mainly prepared by interzeolite conversion, that is, a heterogeneous zeolite (T, Y or SOD) is converted into zeolite CHA in a KOH alkaline environment and used as seeds, so that the raw material cost and energy cost are increased; at the same time, expensive organic template agents or inorganic $Sr^{2+}$ ions harmful to the environment are often used as structure guiding agents in the process of preparing a CHA membrane by the current secondary growth method, which not only further increases the cost of membrane preparation, but is also easy to cause environmental pollution.

SUMMARY

To solve the above problems, the present invention provides a method for preparing a zeolite CHA membrane by heteroseed epitaxial growth.

Heteroseed epitaxial growth is a new method for preparing zeolite CHA membrane based on the crystallization mechanism of interzeolite conversion and using the "structure selection" function of a heterogeneous zeolite (zeolite T, Y or SOD) seed with the same secondary structural unit d6r as that of zeolite CHA to induce the growth of a CHA membrane. Heteroseed epitaxial growth is also a new method for preparing zeolite separation membranes which are complicated in structure and difficult to prepare by conventional methods.

Compared with a conventional method of first converting a heterogeneous zeolite into a zeolite CHA seed and then preparing a membrane, the innovation of the present invention is: the present invention skips the conventional stage of converting the heterogeneous zeolite into the zeolite CHA seed, and directly takes a heterogeneous zeolite (zeolite T, Y or SOD) with the same secondary structural unit (d6r) as that of zeolite CHA as a seed to directly prepare a zeolite CHA membrane on a support.

The Technical Solution of the Present Invention is as Follows

A method for preparing a zeolite CHA membrane, in which a gel conversion method is adopted to assist crystallization, two seed solutions of heterogeneous zeolite (zeolite T, Y or SOD) with different sizes or the same size are successively coated on the surface of a porous support to obtain a heteroseed layer, a synthetic gel is coated on the heteroseed layer to obtain a gel layer, and then the porous support is subjected to a membrane crystallization reaction to obtain a zeolite CHA membrane. The present invention comprises the following steps:

Step (1), coating a seed layer: heterogeneous zeolite seeds are dispersed in deionized water to obtain heterogeneous zeolite seed solutions; a porous support is preheated at 70-200° C. for 2-5 hours, and then the heterogeneous zeolite seed solutions with two sizes or the same size are successively coated on the surface of the porous support and cured at 70-175° C. for 1-10 hours to obtain a uniform, dense and flawless heteroseed layer. The heterogeneous zeolite seeds are zeolite T, Y or SOD;

Step (2), preparing a synthetic gel: the synthetic gel is mainly composed of a silicon source, an aluminum source, a fluorine salt and an alkaline solution; the silicon source is silica sol; the aluminum source is sodium metaaluminate; the fluorine salt is a mixture of sodium fluoride and potassium fluoride, and the molar ratio of sodium fluoride to potassium fluoride is 1:1-5:1; the alkaline solution is a mixture of sodium hydroxide and potassium hydroxide; a stable $SiO_2$—$Na_2O$—$K_2O$—$Al_2O_3$-MF(NaF+KF)—$H_2O$ synthetic gel system is formed by adding the aluminum source, the fluorine salt and the silicon source into the alkaline solution, stirring and aging;

In the synthetic gel, the molar ratios of the components are as follows: $SiO_2/Al_2O_3$=5-30; $H_2O/SiO_2$=26-70; $(Na_2O+K_2O)/SiO_2$=0.24-2.6; Na/K=0.6-10; $MF/SiO_2$=0-0.2.

Step (3), coating a gel layer: the synthetic gel obtained in step (2) is used as a coating solution and uniformly coated on the surface of the porous support after the seed layer is coated in step (1);

Step (4), forming a membrane by crystallization: the porous support coated with the synthetic gel is loaded into an autoclave to crystallize and obtain a zeolite CHA membrane.

In in the step (1), when heteroseeds with different sizes are coated, a heteroseed with a large size is a large heteroseed, a heteroseed with a small size is a small heteroseed; in a large heterogeneous zeolite seed solution, the mass fraction of a large heterogeneous zeolite seed is 1%-3%, and the particle size of heterogeneous zeolite crystal is 0.6-3 μm; in a small heterogeneous zeolite seed solution, the mass fraction of a small heterogeneous zeolite seed is 0.2%-1%, and the particle size of heterogeneous zeolite crystal is 0.05-0.8 μm; when heteroseeds with the same size are coated, coating is repeated for 1-3 times.

In the step (1), the method for obtaining the seed layer from the heterogeneous zeolite seed solutions on the surface of the porous support is an dip-coating method, a hot dip-coating method, a secondary temperature changing hot dip-coating method, a vacuum coating method, a spraying method, a wiping method or a spin coating method, and is preferred to be a secondary temperature changing hot dip-coating method.

In the step (2), conditions for preparing the synthetic gel are as follows: stirring and aging at 20-40° C. for 12-48 hours.

In the step (3), the method for coating the gel layer is an dip-coating method, a hot dip-coating method, a vacuum method, a spraying method, a wiping method or a spin coating method, and is preferred to be an dip-coating method with an dip-coating time of 20-60 seconds.

In the step (4), the crystallization temperature is 100-180° C., and the crystallization time is 2-24 hours.

In the steps (1)-(4), the porous support is a tubular, flat-plate, hollow-fiber or multi-pore support; and is preferred to be a tubular support;

In the steps (1)-(4), the material of the porous support is alumina, zirconia, mullite, stainless steel or metal mesh; the pore size of the porous support is 0.02-40 μm; the material of the porous support is preferred to be alumina, and the pore size of the porous support is preferred to be 0.1-5 μm.

The Present Invention has the Following Beneficial Effects (1) The present invention adopts heteroseed epitaxial growth to prepare a zeolite CHA membrane, which is novel, and adopts a fluorine synthesis system, without the use of expensive organic template agents or $Sr^{2+}$ harmful to the environment, so that the destruction of the membrane caused by high temperature calcination is avoided.

(2) By coating heterogeneous zeolite seeds on a support tube, the zeolite CHA membrane can be directly obtained after high temperature crystallization, and the traditional step of converting the heterogeneous zeolite to synthesize the zeolite CHA as the seeds is skipped, so that the raw material and time costs are greatly saved, the process is simple and easy to operate, the repetition rate is high, the preparation cycle is short, and the present invention has a great industrial prospect and practical significance.

(3) A gel conversion method is adopted as a crystallization method, so that only one layer of synthetic gel is coated on the surface of the support after seed coating, and no waste liquid remains at the bottom of the autoclave, so that the present invention avoids a great waste of a synthetic gel solvent, effectively saves the solvent, reduces environmental pollution, and reflects the concept of green chemistry.

(4) The zeolite CHA membrane synthesized by the method of the present invention has an excellent ethanol/water separation performance: when the temperature is 75° C., the flux of 90 wt. % ethanol/water is 3.35-4.68 kg·m$^{-2}$·h$^{-1}$, and the maximum separation factor is greater than 10000.

(5) The present invention effectively saves the cost of membrane preparation, significantly shortens the cycle of membrane preparation, fully reflects the concept of green chemistry, and has great industrial popularization and practical application values.

DETAILED DESCRIPTION

Specific embodiments of the present invention are further described below in combination with the drawings and the technical solution.

Embodiment 1

(1) α-$Al_2O_3$ support tube preprocessing: the support tube has an outer diameter of 12 mm, an inner diameter of 8 mm, an average pore size of 1-3 and a porosity of about 30%-40%; the outer surface of the support tube is sanded once with 800 mesh and 1500 mesh sandpaper; deionized water is used to remove residual sand particles on the support tube by ultrasonic oscillation, and this process is repeated for several times until the water used to wash the support tube is no longer turbid; then acid and alkali are successively used to remove the residue in the pores of the support by ultrasonic oscillation, and the support tube is washed with deionized water until neutral; finally, the support tube is placed in an oven to be dried and then placed in a muffle furnace to be calcined at 550° C. for 6 hours, and both ends of the support tube are sealed for use;

(2) The support tube obtained in step (1) is preheated at 120° C. for 5 hours, and then rapidly immersed in a zeolite T large seed (3 μm) suspension with a mass concentration of 1 wt. %; the support tube is dried overnight at room temperature, and cured at 120° C. for 1 hour to obtain a seed layer loaded support $A_1$;

(3) Seeds on the surface of the support are wiped off with absorbent cotton; the seed layer loaded support $A_1$ is preheated at 70° C. for 5 hours, and then immersed in a zeolite T small seed (0.8 μm) suspension with a mass concentration of 0.2 wt. %; the support is dried overnight, and cured at 120° C. for 5 hours to obtain a seed layer loaded support $A_2$;

(4) A fluorine-free synthetic gel is prepared with a molar ratio of 0.75$SiO_2$:0.05$Al_2O_3$:0.26$Na_2O$:0.09$K_2O$:25$H_2O$, stirred and aged at room temperature for 12 hours;

(5) The seed layer loaded support A2 is immersed in the synthetic gel for about 20 seconds, loaded into a stainless steel crystallization kettle with a teflon liner and placed in a 180° C. oven for crystallization for 2 hours;

(6) The synthesized zeolite CHA membrane is washed to neutral with deionized water and dried in a 50° C. oven.

Figure 1:
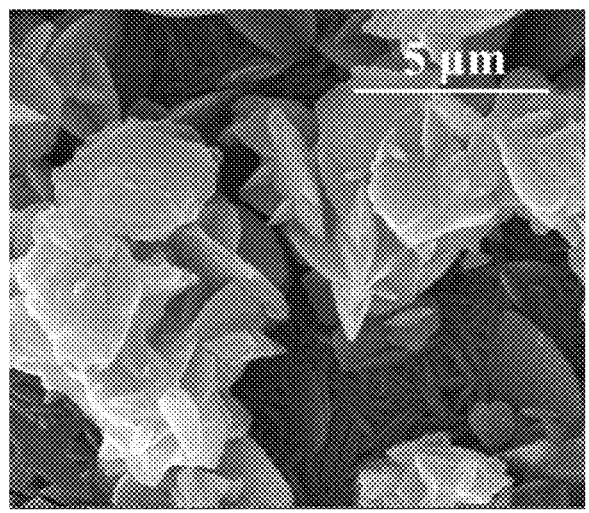
FIG. 1 is a scanning electron microscope (SEM) image of a surface of a zeolite CHA membrane synthesized in embodiment 1.
Figure 2:
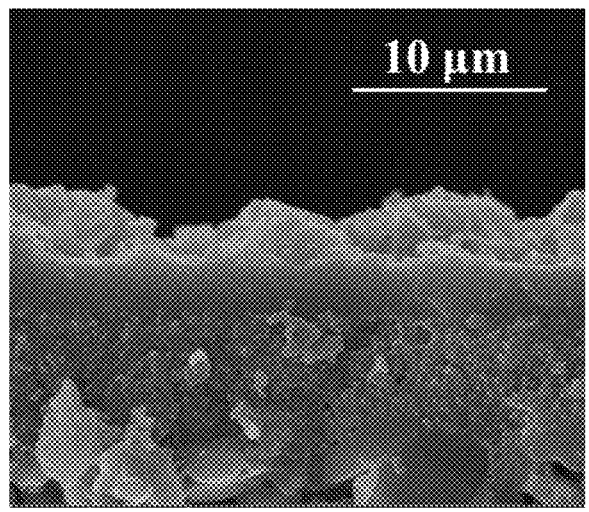
FIG. 2 is a scanning electron microscope (SEM) image of a cross section of a zeolite CHA membrane synthesized in embodiment 1.
Figure 3:
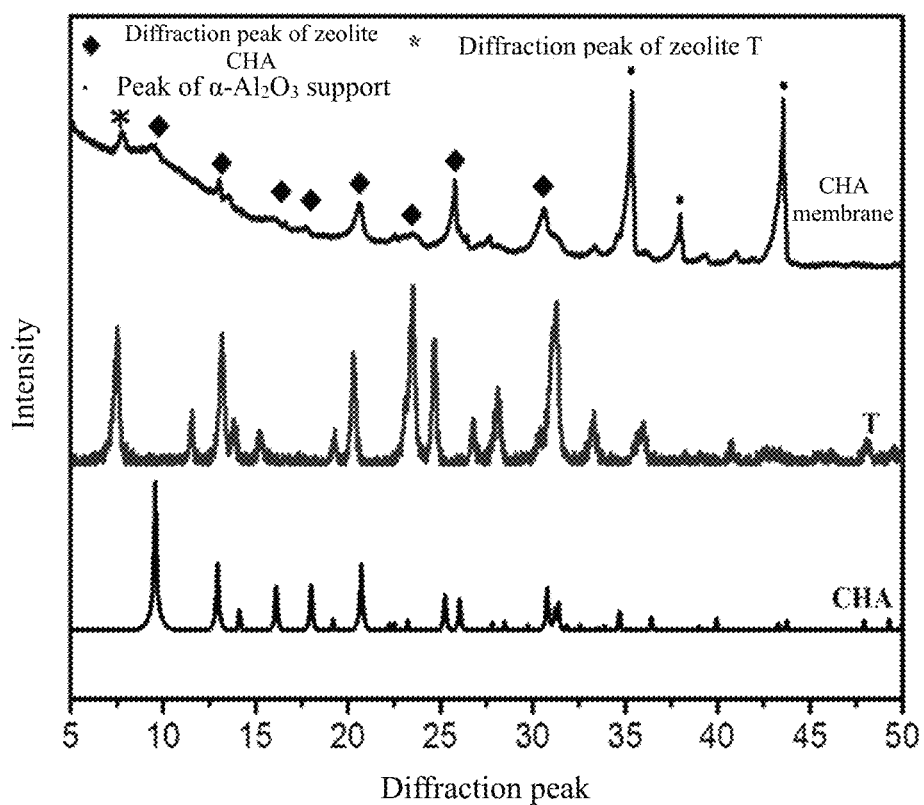
FIG. 3 is an X-ray diffraction (XRD) pattern of a zeolite CHA membrane synthesized in embodiment 1.

It can be seen from FIGS. 1-3 that the zeolite membrane obtained in the embodiment is a zeolite T & CHA membrane, which is suitable for ethanol dehydration. According to a pervaporation test of the zeolite T & CHA membrane prepared in embodiment 1, when the temperature is 75° C., the flux of 90 wt. % ethanol/water is 3.35 kg·m$^{-2}$·h$^{-1}$, and the separation factor is >10000.

Embodiment 2

(1) α-$Al_2O_3$ support tube preprocessing: the support tube has an outer diameter of 12 mm, an inner diameter of 8 mm, an average pore size of 1-3 μm, and a porosity of about 30%-40%; the outer surface of the support tube is sanded once with 800 mesh and 1500 mesh sandpaper; deionized water is used to remove residual sand particles on the support tube by ultrasonic oscillation, and this process is repeated for several times until the water used to wash the support tube is no longer turbid; then acid and alkali are successively used to remove the residue in the pores of the support by ultrasonic oscillation, and the support tube is washed with deionized water until neutral; finally, the support tube is placed in an oven to be dried and then placed in a muffle furnace to be calcined at 550° C. for 6 hours, and both ends of the support tube are sealed for use;

(2) The support tube obtained in step (1) is preheated at 175° C. for 3 hours, and then rapidly immersed in a zeolite T seed (0.8 μm) suspension with a mass concentration of 1 wt. %; the support tube is dried overnight at room temperature, and cured at 175° C. for 3 hours to obtain a seed layer loaded support $B_1$;

(3) Seeds on the surface of the support are wiped off with absorbent cotton; the seed layer loaded support $B_1$ is preheated at 175° C. for 3 hours, and then immersed in a zeolite T seed (0.8 μm) suspension with a mass concentration of 1 wt. % again; the support is dried overnight, and cured at 175° C. for 3 hours to obtain a seed layer loaded support $B_2$;

(4) A synthetic gel is prepared with a molar ratio of 0.5$SiO_2$:0.05$Al_2O_3$:0.42$Na_2O$:0.2$K_2O$:0.08MF(5NaF:1KF):25$H_2O$, stirred and aged at room temperature for 24 hours;

(5) The seed layer loaded support B2 is immersed in the synthetic gel for about 30 seconds, loaded into a stainless steel crystallization kettle with a teflon liner and placed in a 150° C. oven for crystallization for 4 hours;

(6) The synthesized zeolite CHA membrane is washed to neutral with deionized water and dried in a 50° C. oven.

Figure 4:
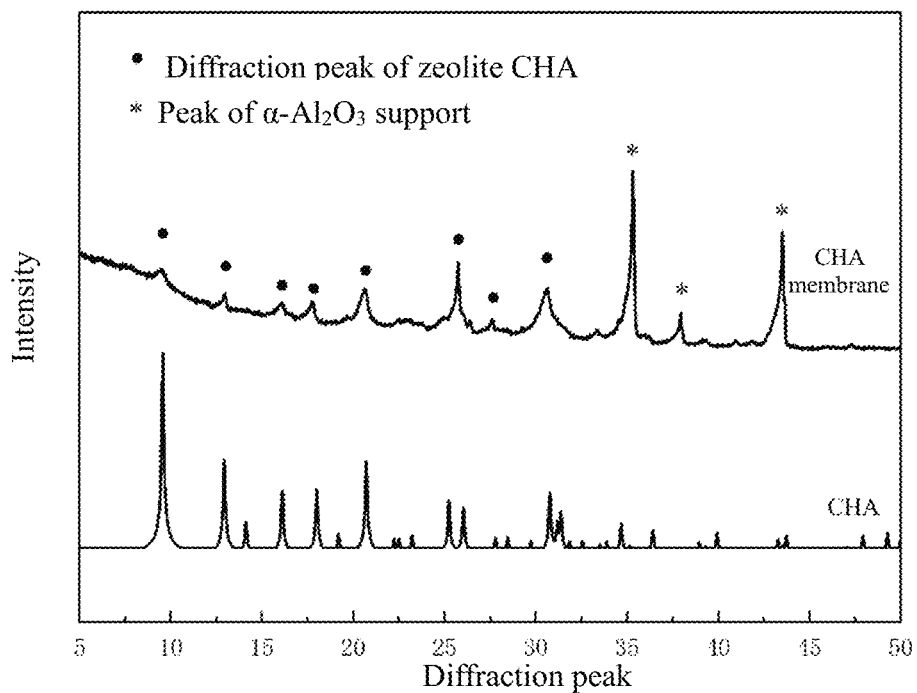
FIG. 4 is an X-ray diffraction (XRD) pattern of a zeolite CHA membrane synthesized in embodiment 2.

It can be seen from FIG. 4 that the zeolite membrane obtained in the embodiment is a zeolite CHA membrane, which is suitable for ethanol dehydration. According to a pervaporation test of the zeolite CHA membrane prepared in embodiment 2, when the temperature is 75° C., the flux of 90 wt. % ethanol/water is 4.68 kg·m$^{-2}$·h$^{-1}$, and the separation factor is >10000.

Embodiment 3

(1) α-$Al_2O_3$ support tube preprocessing: the support tube has an outer diameter of 12 mm, an inner diameter of 8 mm, an average pore size of 1-3 μm, and a porosity of about 30%-40%; the outer surface of the support tube is sanded once with 800 mesh and 1500 mesh sandpaper; deionized water is used to remove residual sand particles on the support tube by ultrasonic oscillation, and this process is repeated for several times until the water used to wash the support tube is no longer turbid; then acid and alkali are successively used to remove the residue in the pores of the support by ultrasonic oscillation, and the support tube is washed with deionized water until neutral; finally, the support tube is placed in an oven to be dried and then placed in a muffle furnace to be calcined at 550° C. for 6 hours, and both ends of the support tube are sealed for use;

(2) The support tube obtained in step (1) is preheated at 200° C. for 2 hours, and then rapidly immersed in a zeolite T large seed (0.6 μm) suspension with a mass concentration of 3 wt. %; the support tube is dried overnight at room temperature, and cured at 70° C. for 2 hours to obtain a seed layer loaded support $C_1$;

(3) Seeds on the surface of the support are wiped off with absorbent cotton; the seed layer loaded support $C_1$ is preheated at 100° C. for 2 hours, and then immersed in a zeolite T small seed (0.05 μm) suspension with a mass concentration of 1 wt. %; the support is dried overnight, and cured at 70° C. for 10 hours to obtain a seed layer loaded support $C_2$;

(4) A synthetic gel is prepared with a molar ratio of $0.5SiO_2:0.05Al_2O_3:0.26Na_2O:0.09K_2O:0.1MF(1NaF:1KF):35H_2O$, stirred and aged at room temperature for 48 hours;

(5) The seed layer loaded support $C_2$ is immersed in the synthetic gel for about 60 seconds, loaded into a stainless steel crystallization kettle with a teflon liner and placed in a 100° C. oven for crystallization for 24 hours;

(6) The synthesized zeolite CHA membrane is washed to neutral with deionized water and dried in a 50° C. oven.

Figure 5:
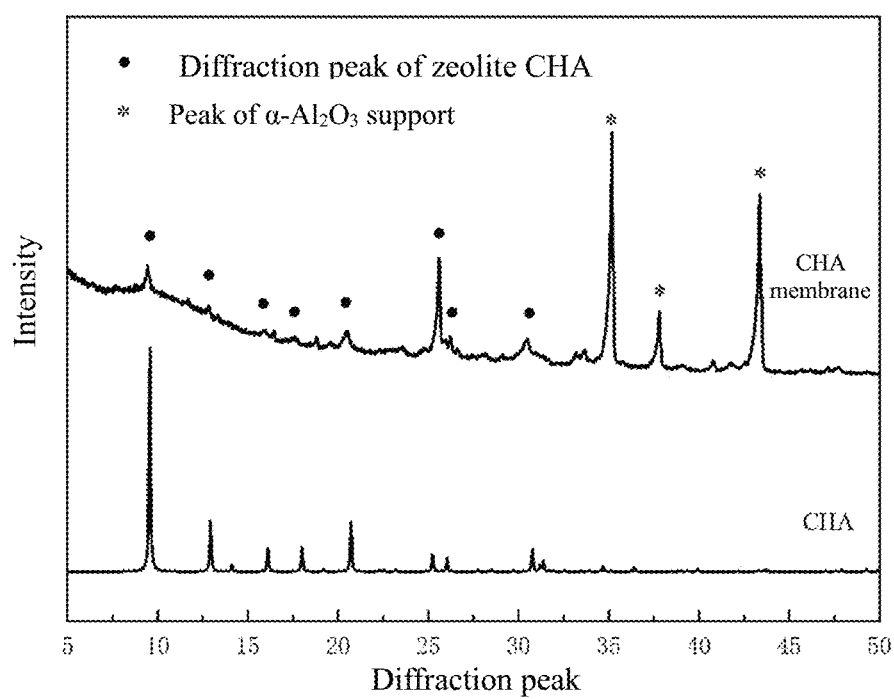
FIG. 5 is an X-ray diffraction (XRD) pattern of a zeolite CHA membrane synthesized in embodiment 3.

It can be seen from FIG. 5 that the zeolite membrane obtained in the embodiment is a zeolite CHA membrane, which is suitable for ethanol dehydration. According to a pervaporation test of the zeolite CHA membrane prepared in embodiment 3, when the temperature is 75° C., the flux of 90 wt. % ethanol/water is 4.12 kg·m$^{-2}$·h$^{-1}$, and the separation factor is 7703.

The invention claimed is:

1. A method for preparing a zeolite CHA membrane, comprising the following steps:
    step (1), coating a seed layer: heterogeneous zeolite seeds are dispersed in deionized water to obtain heterogeneous zeolite seed solutions; a porous support is preheated at 70-200° C. for 2-5 hours, and then the heterogeneous zeolite seed solutions with different particle sizes or same particle size of zeolite seeds are successively coated on the surface of the porous support and dried at 70-175° C. for 1-10 hours to obtain a heteroseed layer; and
    the heterogeneous zeolite seeds are zeolite T, Y or SOD;
    step (2), preparing a synthetic gel: the synthetic gel is composed of a silicon source, an aluminum source, a fluorine salt and an alkaline solution; the silicon source is silica sol; the aluminum source is sodium metaaluminate; the fluorine salt is a mixture of sodium fluoride and potassium fluoride, and the molar ratio of sodium fluoride to potassium fluoride is 1:1-5:1; the alkaline solution is a mixture of sodium hydroxide and potassium hydroxide; a stable $SiO_2$—$Na_2O$—$K_2O$—$Al_2O_3$-MF (NaF+KF)—$H_2O$ synthetic gel system is formed by adding the aluminum source, the fluorine salt and the silicon source into the alkaline solution, stirring and aging;
    in the synthetic gel, the molar ratios of the components are as follows: $SiO_2/Al_2O_3$=5-30; $H_2O/SiO_2$=26-70; $(Na_2O+K_2O)/SiO_2$=0.24-2.6; Na/K=0.6-10; $MF/SiO_2$=0-0.2; and
    conditions for preparing the synthetic gel are as follows: stirring and aging at 20-40° C. for 12-48 hours;
    step (3), coating a gel layer: the synthetic gel obtained in step (2) is used as a coating solution and uniformly coated on the surface of the porous support after the seed layer is coated in step (1);
    step (4), forming a membrane by crystallization: the porous support coated with the synthetic gel is loaded into an auetoclave to crystallize and obtain a zeolite CHA membrane; the crystallization temperature is 100-180° C., and the crystallization time is 2-24 hours.

2. The method for preparing a zeolite CHA membrane according to claim 1, wherein in the step (1), when heteroseeds with different particle sizes are coated, a heteroseed with a large particle size is a large heteroseed, a heteroseed with a small particle size is a small heteroseed; in a large heterogeneous zeolite seed solution, the mass fraction of a large heterogeneous zeolite seed is 1%-3%, and the particle size of heterogeneous zeolite crystal is 0.6-3 μm; in a small heterogeneous zeolite seed solution, the mass fraction of a small heterogeneous zeolite seed is 0.2%-1%, and the particle size of heterogeneous zeolite crystal is 0.05-0.8 μm; when heteroseeds with the same particle size are coated, coating is repeated for 1-3 times.

3. The method for preparing a zeolite CHA membrane according to claim 1, wherein in the step (1), the method for obtaining the seed layer from the heterogeneous zeolite seed solutions on the surface of the porous support is a dip-coating method, a hot dip-coating method, a secondary temperature changing hot dip-coating method, a vacuum coating method, a spraying method, a wiping method or a spin coating method.

4. The method for preparing a zeolite CHA membrane according to claim 3, wherein in the step (3), the method for coating the gel layer is a dip-coating method, a hot dip-coating method, a vacuum method, a spraying method, a wiping method or a spin coating method.

5. The method for preparing a zeolite CHA membrane according to claim 3, wherein the porous support is a tubular, flat-plate, hollow-fiber or multi-pore support; the material of the porous support is alumina, zirconia, mullite, stainless steel or metal mesh; and the pore size of the porous support is 0.02-40 μm.

6. The method for preparing a zeolite CHA membrane according to claim 1, wherein in the step (3), the method for coating the gel layer is a dip-coating method, a hot dip-coating method, a vacuum method, a spraying method, a wiping method or a spin coating method.

7. The method for preparing a zeolite CHA membrane according to claim 6, wherein the porous support is a tubular, flat-plate, hollow-fiber or multi-pore support; the material of the porous support is alumina, zirconia, mullite, stainless steel or metal mesh; and the pore size of the porous support is 0.02-40 μm.

8. The method for preparing a zeolite CHA membrane according to claim 1, wherein the porous support is a tubular, flat-plate, hollow-fiber or multi-pore support; the material of the porous support is alumina, zirconia, mullite, stainless steel or metal mesh; and the pore size of the porous support is 0.02-40 μm.

* * * * *